Patented Oct. 12, 1926.

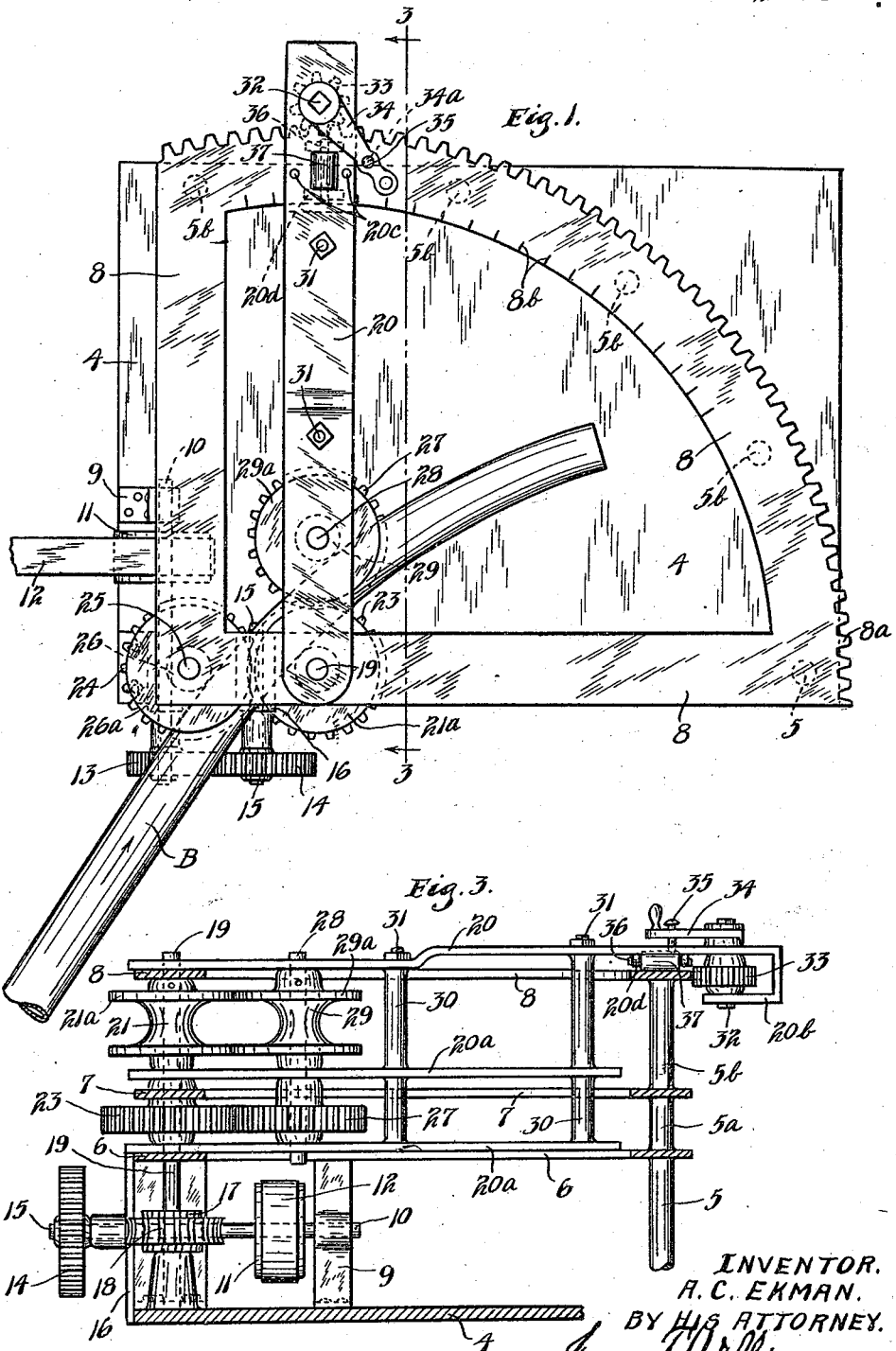

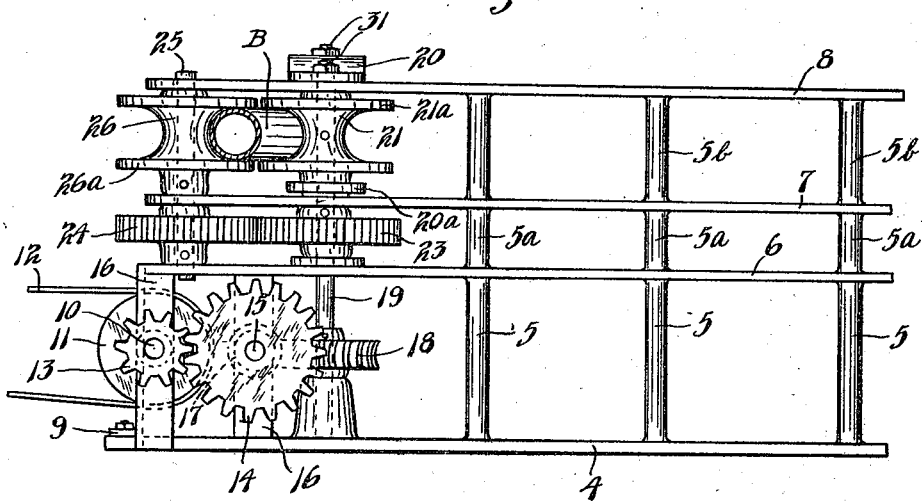

1,602,399

UNITED STATES PATENT OFFICE.

ALBERT C. EKMAN, OF MINNEAPOLIS, MINNESOTA.

PIPE-BENDING MACHINE.

Application filed January 19, 1925. Serial No. 3,303.

This invention relates to a pipe bending machine, and while the machine has utility in bending various kinds of pipes, it is particularly designed for bending heavy pipe or pipe of comparatively large diameter. It has heretofore been the practice to bend such heavy pipe or pipe of comparatively large diameter by the use of forms having the curvature of the desired bend. This usually necessitated heating and filling the pipe and this method of bending the pipe is objectionable on account of the large number of forms or dies necessary and the labor involved. Such large pipe is being increasingly used in many places and it is necessary to bend the pipe into many different forms and curves. It has also been difficult to bend such pipe and at the same time maintain a perfect circular cross section thereof. If the pipe was not properly filled, too rapidly bent or heated to a too high degree there was danger of flattening the same. The present invention also has high utility in operating upon pipe to straighten the same.

It is an object of this invention, therefore, to provide a simple and efficient machine for bending large pipe on any desired radius or curve and at the same time maintaining the pipe of circular cross section.

It is a further object of the invention to provide such a machine having at least three power driven rolls arranged in triangular form between which the pipe is passed and by which it is progressed and bent.

It is also an object of the invention to provide a machine, as set forth in the preceding paragraph, in which the adjacent rolls have flanges extending across the pipe at opposite sides thereof so that the pipe is prevented from bulging at any point and is thus maintained in circular cross sectional shape.

It is further an object of the invention to provide a pipe bending machine comprising at least three power driven rolls journaled on substantially parallel axes which are arranged in triangular form, which rolls have concave peripheries and flanges extending therefrom at top and bottom, which flanges are substantially in contact on the adjacent rolls, the pipe being progressed between said rolls and flanges.

It is still another object of the invention to provide a pipe bending machine comprising at least three power driven rolls journaled on substantially parallel axes and between which the pipe is progressed, at least one of said rolls being mounted on a swinging arm, whereby its position relative to the other rolls may be changed and the curvature of the pipe varied.

It is still further an object of the invention to provide a machine, as set forth in the preceding paragraph, in which said swinging arm is journaled about the axis of one of said rolls.

These and other objects and advantages of the invention will be fully set forth in the following description made in connection with the accompanying drawings in which like reference characters refer to the same parts throughout the different views, and in which, Fig. 1 is a plan view of the machine showing a section of pipe in place therein;

Fig. 2 is a view in side elevation of the machine, as seen from the bottom of Fig. 1; and Fig. 3 is a vertical cross section taken on the line 3—3 of Fig. 1.

Referring to the drawings, the machine comprises a base plate or member 4 shown as substantially rectangular form from which rise the uprights 5 secured thereto in any suitable manner, and which are secured at their upper ends in any suitable manner, to the horizontal plate member 6. The member 6 is, in turn connected by similar uprights 5ᵃ to a horizontal plate or frame member 7, and the member 7 is also, in turn, connected by uprights 5ᵇ to the top plate or frame 8. While the frame may be made of any suitable and desired shape for carrying the operating parts, in the embodiment of the invention illustrated, the members 6, 7 and 8 are shown as having substantially the form of a quadrant, two sides thereof being at right angles and the third side comprising a curve having its center near the end of one of the said sides. A pair of spaced vertical frame members 9 extend between the base 1 and member 6 and have bearings thereon in which is journaled a driving shaft 10, power being applied to said shaft through the pulley 11 from the belt 12, which will be connected to any suitable motor or source of power. The shaft 10 carries at its outer end at one side of the base and member 6 a gear pinion 13 which meshes with a gear 14 secured to a shaft 15 journaled in a bearing carried by an upright 16 extending between the members 4 and 6. The shaft 15 carries a worm gear 17 which meshes with and drives a worm wheel gear 18. The worm wheel gear 18 is secured to a vertical shaft 19 journaled at its lower end in a bearing upstanding from the base 4 and also journaled in bosses on the members 6 and 7, said shafts being also journaled in the member 8 and projecting slightly thereabove where it forms the pivot for a swinging arm 20 extending across the top of member 8 and which will be later described. It may be here stated that the arm 20 comprises spaced portions, one of which is journaled on the shaft 19 immediately below the roll 21. Secured to the shaft 19 by any suitable means, such as by pinning, is a roll 21. It will be noted that the roll 21 has its periphery curved and generally of bi-conical shape, the periphery of the roll thus being concave and substantially in the form of a semi-circle. Flanges 21$^a$ extend across the top and bottom of said roll and the flat inner sides of these flanges are substantially tangent to the semi-circular periphery of the roll. Between the members 6 and 7, the shaft 19 carries a gear 23 which meshes with a similar gear 24, said latter gear being secured to a shaft 25 journaled in the members 6, 7 and 8 and which has secured thereto, as by pins shown, a roll 26 similar to the roll 21 already described, the rolls 21 and 26 being in horizontal alinement. The gear 23 also meshes with and drives a gear 27 disposed between members 6 and 7 which is secured in any suitable manner to a shaft 28, which shaft also has secured thereto, in any suitable manner, as by pinning, a roll 29 similar to the rolls 21 and 26 already described and which is in horizontal alinement with said rolls. It will be noted that, as clearly seen in Fig. 1, the axes of rolls 21, 26 and 29 are arranged in the form of a triangle and that the flanges 21$^a$ on roll 21 are substantially in contact with the flanges 26$^a$ on roll 26 and the flanges 29$^a$ on roll 29, said flanges on all of said rolls being substantially of the same diameter as the pitch lines or circles on the gears 23, 24 and 27.

The arm 20, as above stated, comprises a top portion and a lower portion 20$^a$ which are connected by suitable spacing members 30 which may be held in place and secured to said arms by nutted bolts 31. The upper portion of arm 20 extends across the top of member 8 and beyond the same and has its outer end reversely bent in substantially rectangular form, as shown at 20$^b$. A shaft 32 is journaled in the spaced parts of portion 20$^b$ and has secured thereto a pinion 33. The shaft 32 is of angular shape at its upper end and adapted to receive a crank handle 34, which handle has an aperture 34$^a$ therethrough adapted to receive a pin 35, which pin is also constructed and arranged to enter either one of the apertures 20$^c$ formed in the arm 20 to hold the crank handle 34 in fixed position. The pinion 33 meshes with the rack teeth 8$^a$ formed on the outer edge of the curved side of member 8 so that arm 20 may be traversed about its pivot. The arm 20 is shown as having depending lugs 20$^d$ carrying a pin 36 on which is journaled an anti-friction roller 37 adapted to roll upon the top of the curved portion of member 8.

The inner edge of the curved portion of member 8 is provided with graduations 8$^b$ with which one straight edge of the top portion of arm 20 is adapted to co-operate.

In operation, power is applied to the machine through the belt 12 and pulley 11 and motion is thus transmitted through the shaft 19 to the gears 23, 24 and 27, and thus to the rolls 21, 26 and 29, which rolls are thus individually power driven. The pipe B is entered between roll 21 and the rolls 27 and 29. The pipe is frictionally and firmly engaged by the peripheries of said rolls and advanced therebetween, a curve being imparted to the pipe, as shown in Fig. 1. The pipe is thus progressed and bent. It will be noted that the flanges at the top and bottom of the rolls extend across the top and bottom of the pipe B or at opposite sides thereof and beyond the center of the pipe. The pipe is thus prevented from bulging and is thus maintained in circular cross sectional shape. As will be seen in Fig. 1, the flanges 26$^a$ on roll 26 extend across the top and bottom of the pipe before it reaches roll 21. As the pipe advances from between the flanges 26$^a$ on roll 26 it passes immediately between the flanges 21$^a$ on roll 21 and as it leaves the flanges 21 it passes immediately between the flanges 29$^a$ on roll 29. The pipe is thus continuously engaged at opposite sides by the flanges on the three rolls as well as being engaged by the concave peripheries of the rolls. Any tendency of the pipe, therefore, to bulge or flatten is prevented and the pipe, as stated, is held in its circular cross sectional shape throughout the entire bending zone of the machine, the flanges of the rolls extending beyond the bending zone. The radius at which the pipe is bent can be varied by swinging the arm 20 and thus varying the position of roll 29.

Iron and steel pipe, especially the heavier pipe, varies considerably in the quality and characteristics of the metal. Some pipe will spring back to a larger radius after being bent. In practice, therefore, it has been customary to reciprocate the pipe or portions thereof back and forth between the rolls to obtain the desired permanent bend therein. It is also necessary to move the arm 20 during the bending operation to secure certain bends and this may be done by any convenient means, such as by the crank 34 and pinion 33. By moving the said crank the pinion to arm 20 is traversed across member 8 about its pivot shaft 19. It will be seen that the crank 34 and arm 20 may be held in various positions by insertion of the pin 35 in either of the holes 20°. As the crank can also be changed in its positions on the shaft 32, quite a number of fixed positions for the arm 20 will be possible and said arm can be moved small distances and held in fixed position. A large pipe can thus be bent very accurately on any desired bend or with any desired radius and with radii differing very little in length. It will be clearly noted that all of the rolls 21, 26 and 29 are power driven so that the pipe is progressed evenly and continuously through the machine. The machine will use several sets of rolls corresponding to the standard sizes of heavy pipe or the size to be bent. The rolls will be arranged for easy and quick removal and exchange.

The machine has been found to be very efficient for straightening pipe, using two or more of the rolls in certain positions.

From the above description it is seen that applicant has provided a very simple and efficient machine for bending large pipe. The pipe is bent without heating or filling and very accurate bends can be made therewith. The pipe is maintained in perfect circular cross section and the curvature of the bend can be quickly and easily varied. The machine is comparatively simple and the same has been successfully used in actual practice in bending various sizes of large pipe and extra heavy pipe on various radii. The pipe bending machines of the prior art require special firm and heavy foundations to which they are secured. The present machine is portable and does not have to be heavily anchored to any special foundation. The power required for the machine is comparatively small. In the plant where the machine is being used, a machine of the type for bending heavy pipe about a form requires a thirty H. P. motor. The present machine bends the same sizes of heavy pipe as said machine and a fifteen H. P. motor has been found to be ample, and the pipe is bent just as quickly.

It will, of course, be understood, that various changes may be made in the form, details, arrangement and proportions of the parts without departing from the scope of applicant's invention, which, generally stated, consists in a device capable of carrying out the objects above set forth in the novel parts and combinations of parts disclosed and defined in the appended claims.

What is claimed is:

1. A machine for bending heavy pipe having in combination three revoluble rolls arranged in triangular relation between which said pipe passes, each having a concave periphery substantially semi-circular in outline and having flanges at each end with inner parallel surfaces extending beyond said concave periphery, said flanges of two of said rolls which are at one side of the pipe being substantially in contact with the flanges of the other roll which is at the other side of the pipe whereby, as said pipe moves between said rolls, it is contacted at opposite sides substantially continuously by said flanges throughout the bending zone.

2. A machine for bending heavy pipe having in combination, three revoluble rolls arranged in triangular relation between which said pipe passes, each having a concave periphery substantially semi-circular in outline and having flanges at each end with inner parallel surfaces extending beyond said concave periphery, said flanges of two of said rolls which are at one side of the pipe being substantially in contact with the flanges of the third roll which is at the other side of the pipe, a gear rigid with said third roll, gears rigid with said two rolls meshing with said gear, an arm on which one of said two rolls is carried swingable about the axis of said third roll, and means for swinging said arm and holding it in fixed position.

3. A machine for bending heavy pipe having in combination, three revoluble rolls arranged in triangular relation between which said pipe passes, said rolls having substantially parallel axes and each having a concave periphery substantially semi-circular in outline and having flanges at each end with inner peripheral surfaces substantially tangent to and extending beyond said concave periphery, the flanges of two of said rolls which are at one side of said pipe being substantially in contact with the flange of the roll which is at the other side of the pipe whereby as said pipe moves between said rolls it is contacted at opposite sides substantially continuously by said flanges throughout the bending zone and means for swinging one of said two rolls at one side of said pipe about the axis of the roll at the other side of the pipe whereby the flanges of said rolls will remain substantially tangent, and means for driving at least one of said rolls.

In testimony whereof I affix my signature.

ALBERT C. EKMAN.